DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 400

T914,008

REACTING UNSATURATED DICARBOXYLIC ACIDS, ANHYDRIDES AND ESTERS THEREOF WITH POLYETHYLENE

Richard L. McConnell, 421 Manderley Road, and Willis C. Wooten, Jr., 521 Lakewood Road, both of Kingsport, Tenn. 37660

Continuation of application Ser. No. 105,634, Jan. 11, 1971. This application Oct. 12, 1972, Ser. No. 297,155

Int. Cl. C08f *27/00*

U.S. Cl. 260—78.4 D

No Drawing. 20 Pages Specification

A process for the preparation of a modified polyethylene composition comprising reacting polyethylene with an unsaturated polycarboxylic acid, anhydride or ester thereof in the presence of a free radical and a solvent having the formula

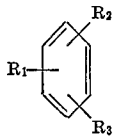

wherein each of $R_1$, $R_2$ and $R_3$ is hydrogen, alkyl having 1–10 carbon atoms, chlorine, bromine, bromoalkyl having 1–10 carbon atoms and 1–3 bromine atoms, chloroalkyl having 1–10 carbon atoms and 1–3 chlorine atoms, and products thereof. These modified polyethylenes are substantially non-crosslinked, have saponification numbers of at least 6 and are useful as adhesives, emulsifiable products, and coating materials.